United States Patent [19]

Owens

[11] Patent Number: 4,931,331

[45] Date of Patent: Jun. 5, 1990

[54] LAMINATED TILE PRODUCT, METHOD FOR PRODUCING THE SAME AND METHOD FOR INSTALLING THE SAME

[76] Inventor: Charles R. Owens, 6100 Valley View Dr., Alexandria, Va. 22310

[21] Appl. No.: 177,947

[22] Filed: Apr. 5, 1988

[51] Int. Cl.$^5$ .............................................. B32B 3/14
[52] U.S. Cl. ..................................... 428/47; 428/15; 428/49; 428/55; 428/99; 428/119; 428/131; 428/137; 428/441; 428/702; 52/386; 52/389; 52/390; 52/391; 52/612
[58] Field of Search .................. 428/131, 15, 44, 45, 428/47, 49, 55, 99, 137, 150, 451, 441, 210, 702, 119; 52/612, 390, 391, 389, 386, 387, 309.17; 156/157, 60, 70, 299

[56] References Cited

U.S. PATENT DOCUMENTS

| | | | |
|---|---|---|---|
| 2,168,949 | 8/1939 | Bentz et al. | 52/390 |
| 3,504,470 | 4/1970 | Pincemin | 422/49 |
| 4,218,496 | 8/1980 | Savignac | 427/263 |
| 4,259,061 | 3/1981 | Dubetsky | 432/13 |
| 4,446,190 | 5/1984 | Pernici | 428/49 |
| 4,621,001 | 11/1986 | Bard | 428/49 |
| 4,624,815 | 11/1986 | Montarrege | 428/45 |

OTHER PUBLICATIONS

"GL Marble", Marble Technics, Ltd.

*Primary Examiner*—Ellis P. Robinson
*Assistant Examiner*—Donald J. Loney
*Attorney, Agent, or Firm*—Antonelli, Terry, Stout & Kraus

[57] ABSTRACT

A tile product is disclosed which comprises a ceramic substrate having opposed major surfaces, a layer of natural stone and an adhesive bonding the layer of natural stone to one of the major surfaces of the ceramic substrate. The layer of natural stone preferably comprises a plurality of strips made of fossilstone and the substrate is preferably made of an unglazed ceramic bisque. A method for producing a laminated tile product includes providing a ceramic substrate having opposed first and second major surfaces; providing a layer of natural stone having opposed first and second major surfaces; providing an adhesive material on at least one of the first major surface of the substrate and the first major surface of the layer of natural stone; assembling the ceramic substrate and the layer of natural stone so that the first major surface of the ceramic substrate faces the first major surface of the layer of natural stone with the adhesive material therebetween; and polishing the second major surface of the layer of natural stone. The polishing of the second major surface of the layer of natural stone preferably causes heat which bonds the layer of natural stone to the substrate. A plurality of the laminated tiles of the present invention are installed by providing an installation surface, selecting an adhesive; coating the installation surface with the adhesive; and applying said plurality of laminated tiles to the adhesive.

17 Claims, 4 Drawing Sheets

LAMINATED TILE PRODUCT, METHOD FOR PRODUCING THE SAME AND METHOD FOR INSTALLING THE SAME

BACKGROUND OF THE INVENTION

The present invention relates to a laminated tile product having an upper laminate of natural stone and a lower laminate of ceramic tile, a method for producing the same and a method for installing the same.

It is desirable to provide a tile product having the appearance of solid natural stone such as marble, but without the disadvantages of solid stone. Natural stone such as marble is often used as a floor or wall covering tile. A single piece or slab of natural stone such as marble is generally cut and finished to form a tile of desired size and shape. However, due to the high density of natural stones such as marble, tiles of acceptable thickness are very heavy. Thinner tiles, on the other hand, have limited strength and tend to shatter or break.

Conventional natural stone tile, e.g. marble, is very difficult to install, and installation is generally done by an experienced "marble man," i.e., installation of marble is generally not thought of as a "do-it-yourself" project One of the most difficult aspects of natural stone, e.g., marble, installation is the selection of an appropriate mortar mix to adhere the stone to the, e.g., wall or floor. Marble mortar mix is fundamentally composed of mortar and sand. However, different pieces of natural stone require different mixes. The mix is chosen primarily based on the density of the stone which "marble men" learn to judge by feel, touch, sound, sight and even taste. "Marble men" routinely exchange information regarding techniques and variations for mixing mortar, sand and other components to make various mortar mixes. The selection and mixing of mortar mixes can be thought of more as an art than a science. Additives are mixed with mortar and sand, such as perlite which adds body to the mix to give it more "stand-up" ability. The additives are also chosen for their sound insulation qualities. As a consequence of the knowledge required to lay natural stone tiles, the installation costs on a square foot basis are high and, further, there is a limited supply of skilled masons who are available to install natural stone tiles.

Conventional natural stone tiles must be installed by "floating" the tiles on the mortar mix; that is, the back surface of the tile is not brought into contact with the surface on which it is being installed. Thus, a further difficulty in installing conventional natural stone tiles resides in the need to use a mortar mix having the correct thickness and viscosity to float the stone tiles so that the upper surfaces of all the installed tiles are level. Thickness variations within each tile and between a plurality of tiles further complicate installation. These thickness variations are due to the fact that the major surfaces of the stone slabs which are ground and polished to form tiles are not flat. Thus, there is no flat surface to serve as a datum plane during the grinding and polishing operations.

The problem of selection and mixing of appropriate adhesives is particularly acute when the installation design requires use of multiple colors of stone, multiple types of stone or both multiple colors and multiple types of stone. For example, as shown in FIG. 1, an installation design may require use of more than one type of natural stone tile. For example, two types of natural stone tile designated A and B may be required. The types A and B may differ in color or may differ in the type of natural stone, e.g., type A may be marble and type B may be slate. Using conventional natural stone tiles, a different mortar mix may preferably be used for type A than would be used for type B. Differences in density even among type A tiles or among type B tiles may require selection and use of different mortar mixes. These factors contribute to the difficulty of installing conventional natural stone tiles.

The installation of ceramic tiles is conventionally done with mastics which are purchased in pre-mixed containers. The mastic has a standard viscosity which is easily worked with tools designed for ceramic tile installation. Furthermore, the ceramic tiles typically have protrusions to establish a uniform adhesive thickness and height with respect to the surface on which the ceramic tile is being installed. Unlike the installation of natural stone with mortar mixes, the installation of ceramic tile may be performed with less skilled labor including substantial installation on a "do-it-yourself" basis.

U.S. Pat. No. 3,878,030 to Cook states that the prior art has suggested solving some of the problems associated with natural stone, particularly with marble, by bonding a plurality of small pieces having the desired texture and thickness to an underlying piece of the same material. The underlying piece is then chosen from stone strata which does not have the desired texture and which is therefore less expensive. In this manner, the more expensive desirable pieces can be cut thin so as to increase their economic utilization and are bonded to a generally thicker layer of less valuable stone. However, it is disclosed that the bonding of stone to stone still produces a relatively thick and quite heavy structure. It is also disclosed that such stone-to-stone structures are brittle and require considerable care in finishing, handling, storage and installation. Cook proposes providing a piece of wood product, such as a fiberboard, as an underlayment, then applying a bonding material, preferably a two-part curable cement, to the underlayment and/or to one surface of a plurality of discrete pieces of relatively thin stone. The stone pieces are then placed on the top of the underlayment and the cement is allowed to cure to firmly bond the pieces to the underlayment. Thereafter, the bonded-together structure is subjected to a finishing operation including a grinding operation while subjecting to a water bath and then to a polishing operation such as the use of a felt polishing wheel in connection with a tin oxide slurry or powder.

U.S. Pat. No. 3,097,080 to Weir discloses an artificial stone facing plaque which comprises essentially a thin body with a decorative upper or forward face, and composed of a settable synthetic organic plastic material in which are embedded, at least partially, a plurality of pieces of relatively coarse aggregate. If desired, the plastic plaque may be bonded to a suitable backing strip which may be formed of any suitable material such as, for example, asbestos cement board. It is often desirable to have the top portion of the individual aggregate partially ground off to form the polished surfaces. In some instances, it is also desirable to have the exposed forward or top decorative face of the plaque smooth and polished In such instances, the protruding portions of the aggregate and also a portion of the plastic face or surface are ground away so that the final exposed surface of the plaque is slightly below that of the original forward surface of the plastic body.

U.S. Pat. No. 4,621,001 to Bard discloses a tile-shaped composite element in which a ceramic tile serving as the visible tile is glued to a further ceramic tile serving as the base tile. Each tile is provided on the back with a nesting structure and glued together with this nesting structure back-to-back. Since the wall thickness of such a composite element may correspond to the usual wall thickness of shingles of conventional ceramic tiles, extremely thin tiles may be used as the base tile and the visible tile placed thereupon.

U.S. Pat. No. 4,640,850 to Marocco discloses a composite facing slab which comprises a sheet of natural stone, such as marble, and a protective layer constituted by a sheet of transparent glass. The latter is fixed to the face of the stone sheet intended to remain visible with the interpositioning of an interlayer of transparent thermoplastic material which can adhere to both the sheets and fills the surface defects of the stone sheet.

U.S. Pat. No. 4,664,955 to Clem discloses a composite laminate for use in paneling of walls, ceilings and other surfaces such as furniture and the like. The composite laminate comprises a polymeric sheet-like core having a pair of surfaces to which are bonded a metal foil so as to form a sandwich-type structure and wherein a lamina of natural facing stone is uniformly bonded to at least one of the pair of metal foils.

U.S. Pat. No. 4,036,929 to Gould discloses a method of forming decorative inserts in granite and the like. A cavity is cut or sandblasted in the stone to produce a decorative design. An epoxy resin base is inserted into the cavity and permitted to set. Decorative glass chips are arranged in a mosaic-like pattern in a resin of similar properties to the base, the mortar and a bond is formed between the base resin, the mortar resin and the decorative chips to provide a pattern on the stone.

However, it is still desired to provide a tile product the appearance of which is equivalent to ordinary marble slab, but is lighter in weight and higher in strength than ordinary marble.

The present invention provides a tile product having an upper laminate of natural stone and a lower laminate of ceramic tile, the appearance of which is equivalent to solid natural stone tile, but which is lighter in weight and higher in strength than natural stone and which is stable in moist environments, i.e., is moisture-impervious.

The present invention provides a tile product, the appearance of which is equivalent to solid natural stone tile, but which is lighter in weight and higher in strength than natural stone and which may be precisely sized and shaped, e.g., squared, so that it may be easily installed with or without grout between the tiles.

The present invention further is a method for producing a laminated tile product of the aforementioned type.

The present invention provides a method for installing a laminated tile product which avoids the difficulties encountered in installing conventional natural stone tile and enables installation by relatively unskilled individuals, i.e., enables "do-it-yourself" installation.

A laminated tile product in accordance with the present invention comprises a ceramic substrate having opposed major surfaces, a layer of natural stone and an adhesive for bonding the layer of natural stone to one of the major surfaces of the ceramic substrate. The layer of natural stone preferably comprises a marble-type stone, e.g., a plurality of strips made of fossilstone. The substrate is preferably made of an unglazed ceramic bisque. Such a tile product is stable in moist environments, may be precisely sized and shaped and exhibits high dimensional stability.

A method for producing a laminated tile according to the present invention includes providing a ceramic substrate having opposed first and second major surfaces which are substantially parallel; providing a layer of natural stone having opposed first and second major surfaces; providing an adhesive material on at least one of the first major surface of the substrate and the first major surface of the layer of natural stone; assembling the ceramic substrate and the layer of natural stone so that the first major surface of the ceramic substrate faces the first major surface of the layer of natural stone with the adhesive material therebetween; and polishing the second major surface of the layer of natural stone. The polishing of the second major surface of the layer of natural stone preferably causes heat which bonds the layer of natural stone to the substrate.

A method for installing a laminated tile according to the present invention includes providing a plurality of laminated tiles, each of the laminated tiles comprising a ceramic substrate having opposed major surfaces, a layer of natural stone, and a first adhesive bonding the layer of natural stone to one of the opposed major surfaces of said ceramic substrate; providing an installation surface; selecting a second adhesive having adhesive properties chosen for attaching a ceramic substrate to a surface; coating the installation surface with the second adhesive; and applying the plurality of laminated tiles to the second adhesive.

DETAILED DESCRIPTION OF THE INVENTION

Figure 2:
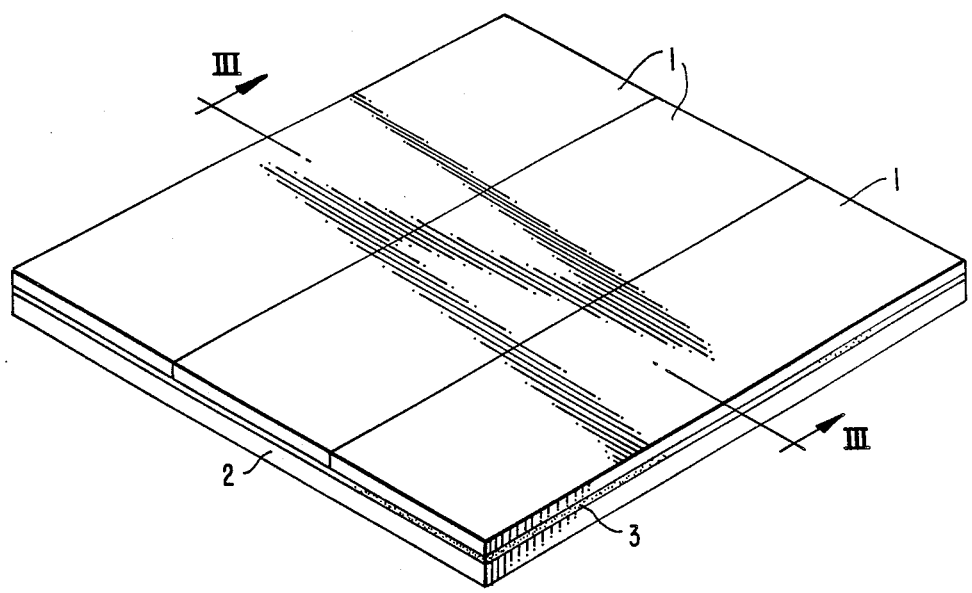
FIG. 2 is a top perspective view of the laminated tile of the present invention.
Figure 3:
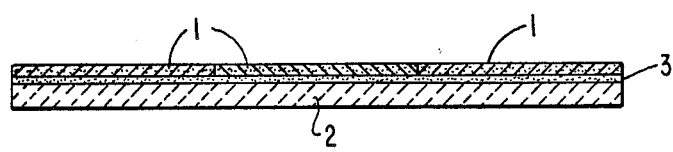
FIG. 3 is a cross-sectional view of the laminated tile of the present invention taken along line III—III of FIG. 1.

As shown in FIGS. 2 and 3, the tile product of the present invention is made of a layer of natural stone 1 bonded to a substrate 2 by bonding material 3. The tile may be made in any convenient shape such as the square shape shown in FIG. 2. The tile may be made in any convenient size such as 4¼"×4¼" square or 12"×12" square. Of course, other sizes and shapes may be utilized.

The natural stone 1 is preferably marble. However, other stones such as travertine, granite, limestone, slate, sandstone, onyx, quartzite, jade, bluestone, serpentine, silicified wood, etc., may also be used. Fossilstone is an example of a naturally occurring type of marble-like stone which is mined in, e.g., Cebu, Philippines. An analysis of fossilstone reveals that it is legally classified as marble, i.e., is a carbonated crystallized rock that can, once polished, have a nice finish and can be used as an ornamental stone.

While a single piece of natural stone may serve as the natural stone 1 of the tile product of the present invention, it is preferable to use a plurality of strips 1 of natural stone, as shown in FIGS. 2 and 3. The use of a plurality of laminates 1 on each ceramic substrate 2 permits decorative patterns to be achieved and may simplify the cutting operations required to produce the individual laminates 1 in that the use of smaller pieces may simplify handling operations of the stone blocks from which the laminates are cut and lessen waste material. For example, rough fossilstone can be cut into rectangular strips, e.g., $1\frac{1}{2}'' \times 6'' \times \frac{1}{8}''$ for adherence to a ceramic base 2, e.g., exactly $6'' \times 6'' \times \frac{1}{4}''$. Of course, the natural stone can be cut into a single, e.g., $6'' \times 6'' \times \frac{1}{4}''$ thick piece to precisely match the dimensions of the substrate 2.

Fossilstone is one preferred type of stone since, among other things, it can be found in a wide variety of colors. Moreover, the surface of the fossilstone is stain-resistant.

If a plurality of strips 1 are used, the edges of the strip are planed and polished such that when they are laid together side-by-side, they form a virtually seamless tile.

The natural stone 1 may have, preferably, a thickness of $\frac{1}{8}''$ to $\frac{1}{4}''$.

The substrate 2 is formed of a material which has a coefficient of expansion close to that of the natural stone 1, such as ceramic. Preferred ceramic materials include bisque-type materials which are fine-grained, low sand content vitreous materials and which are moisture-impervious, strong and impact-resistance. The substrate 2 is most preferably an unglazed bisque tile which is vitrified through high-temperature firing at a minimum of 1,050° C. Vitrification fuses the clay into a marble-like substance whose coefficient of expansion closely matches that of the natural stone 1. If the vitrification temperature is below about 1,050° C., the ceramic will not be moisture-impervious, and will have low strength and density. If the vitrification temperature is too high, however, the clay will fuse into a glass-like substance which is not impact-resistant. Neither is preferable.

The overall thickness of the composite tile product with the top laminate(s) 1 and ceramic substrate 2 may be made less than a solid natural stone tile product of comparable impact and load-bearing resistance as a consequence of the laminates and matched characteristics of the laminates and ceramic substrate. Preferably, the physical properties of the laminates 1 and the ceramic substrate 2 are as closely matched as possible.

The thermal expansion coefficient of various natural stones are shown in the following table:

| Natural Stone | Coefficient of Expansion (in/in/°F.) |
| --- | --- |
| Granite | $4.7 \times 10^{-6}$ |
| Limestone | $4.4 \times 10^{-6}$ |
| Marble | $5.6 \times 10^{-6}$ |
| Sandstone | $6.1 \times 10^{-6}$ |
| Slate | $5.8 \times 10^{-6}$ |

It is desirable that the ceramic have a thermal expansion coefficient close to that of the natural stone selected The substrate 2 can be made of any convenient size such as: $4\frac{1}{4}'' \times 4\frac{1}{4}'' \times \frac{1}{4}''$, $4\frac{1}{4}'' \times 4\frac{1}{4}'' \times \frac{1}{4}''$, $4'' \times 8'' \times \frac{1}{4}''$, $6'' \times 6'' \times \frac{1}{4}''$, $6'' \times 6'' \times \frac{3}{8}''$, $6'' \times 6'' \times \frac{1}{2}''$, $6'' \times 8'' \times \frac{1}{4}''$, $6'' \times 8'' \times \frac{3}{8}''$, $6'' \times 8'' \times \frac{1}{2}''$, $8'' \times 8'' \times \frac{1}{4}''$, $8'' \times 8'' \times \frac{3}{8}''$, $8'' \times 8'' \times \frac{1}{2}''$, $8'' \times 12'' \times \frac{1}{4}''$, $8'' \times 2'' \times \frac{3}{8}''$, $8'' \times 12'' \times \frac{1}{2}''$, $12'' \times 12'' \times \frac{1}{4}''$, $12'' \times 12'' \times \frac{3}{8}''$ and $12'' \times 12'' \times \frac{1}{2}''$.

The material of which the substrate is made is preferably selected so that the substrate is fluid-impervious. A laminated tile having a fluid-impervious substrate will be stable in moist environments, such as shower installations and below ground level flooring installations. Such a tile will resist delamination in moist environments. The substrate also serves as a sound-insulating material.

The substrate preferably has high dimensional stability to impart strength to the laminated tile. It is also preferable to form the substrate with dimensions, e.g., squareness, which can be exactly reproduced from substrate to substrate. The laminated tile formed with such substrates is easily installed and can, if desired, be installed in such a manner that the edges of adjacent tiles align without or with very little space therebetween so that grout is unnecessary.

The substrate may have, preferably, a thickness of 3 mm (about $\frac{1}{8}''$) to 10 mm (about $\frac{3}{8}''$).

Figure 4:
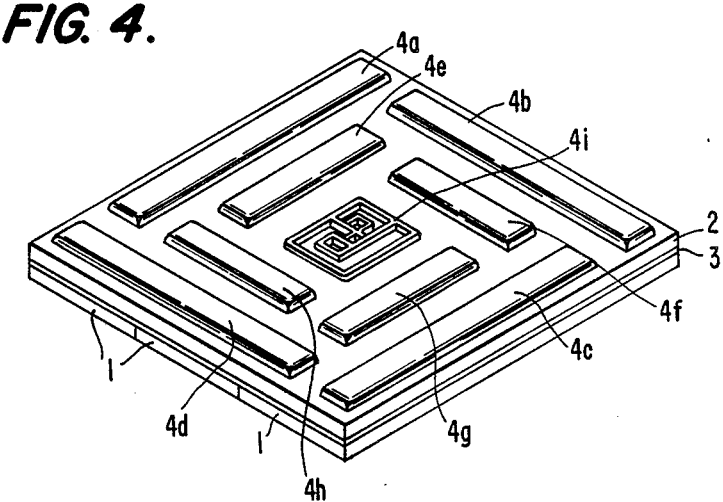
FIG. 4 is a bottom perspective view of the laminated tile of the present invention.

As shown in FIG. 4, the substrate 2 preferably has a plurality of raised protrusions 4a–4i in any desired number and pattern. The edges of the protrusions 4a–4i preferably roll to meet the level of the non-raised portions of the back of substrate 2. These protrusions allow the use of a thin-set adhesive to be described later. Upon installation, the surfaces of the protrusions contact the surface on which the tile is installed. The spaces between protrusions 4a–4i are the primary reservoirs for the adhesive.

The adhesive 3 is one that is indifferent to or, preferably, enhanced by heat and pressure, e.g., is heat-cured. Preferably, the adhesive hardens quickly. For example, the adhesive 3 may contain a relatively large amount of hardener. For example, the adhesive may consist essentially of 1 liter Polylite, 0.25 liter styrene, 10 drops cobalt in a paste carrier heated to the liquid state, and 30 cc hardener. However, other adhesives may also be utilized.

The laminated tile product of the present invention can be made lighter in weight than natural stone slabs of comparable size. This has tremendous cost savings advantages, especially in transportation and handling.

Figure 5A:
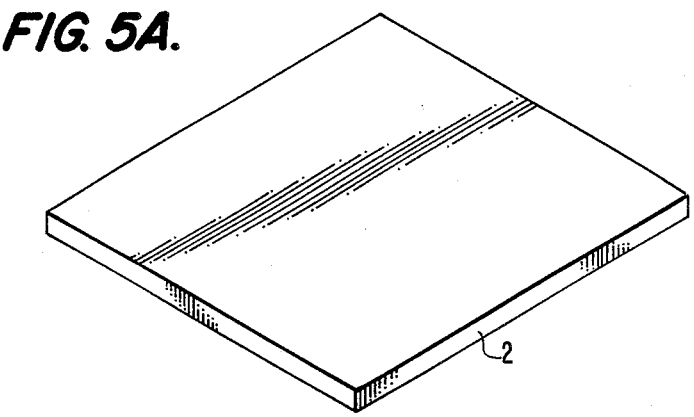
FIGS. 5A-5C are top perspective views of various stages of the method for producing the tile products of the present invention.
Figure 5B:
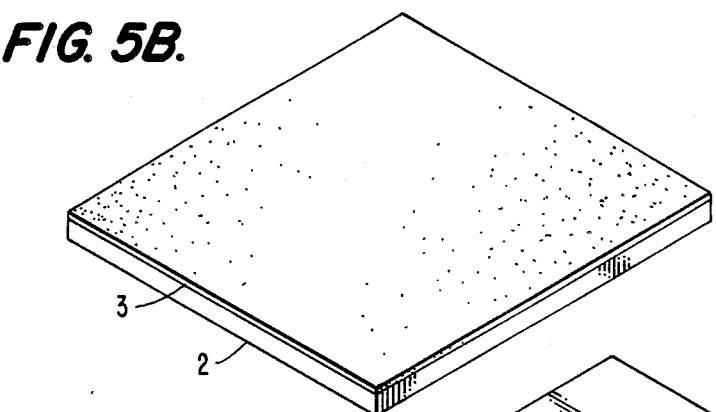
Figure 5C:
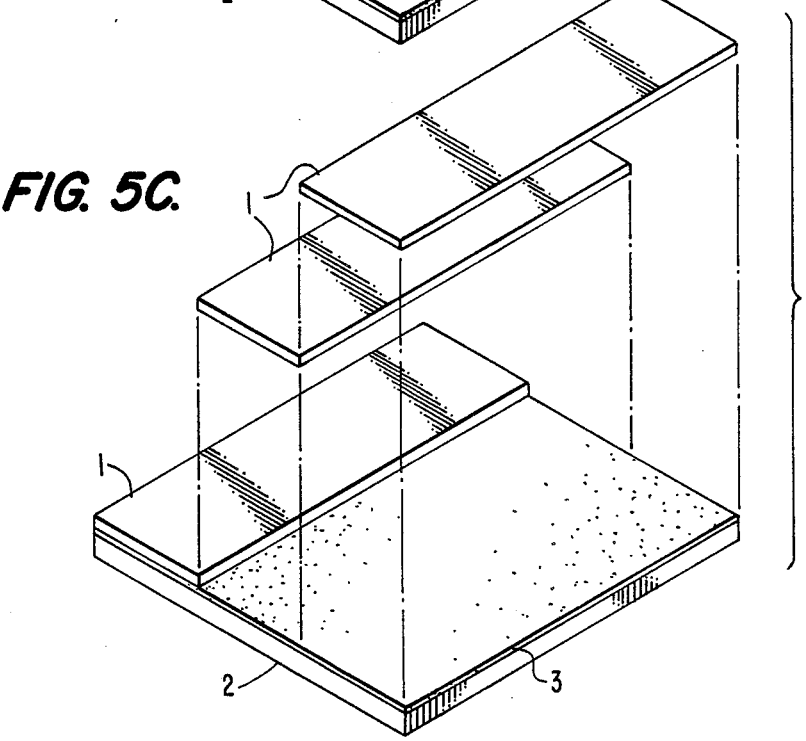

As shown in FIGS. 5A–5C, the laminated tile product of the present invention is preferably produced by providing a ceramic substrate 2 as shown in FIG. 5A and a layer 1 of natural stone, each of which has opposed first and second major surfaces. The ceramic substrate 2, which preferably is a bisque-type commercially available tile product is further characterized by the first and second opposed major surfaces being substantially parallel to each other, i.e., as parallel as may be obtained in commercially available ceramic tiles. An adhesive material is provided on at least one of the first major surface of the substrate and the first major surface of the layer of natural stone. The ceramic substrate is assembled with the layer of natural stone so that the first major surface of the ceramic substrate faces the first major surface of the layer of natural stone, with the adhesive material being provided between the opposed first major surfaces. Thereafter, the second major surface of the layer of natural stone is polished by a conventional polishing operation such as that illustrated in FIG. 6.

The adhesive 3 is preferably applied to the substrate 2 as shown in FIG. 5B. The natural stone 1 can be provided in a single piece or a plurality of pieces or strips as illustrated in FIG. 5C. If strips 1 are used, they are fitted together on the substrate 2 and adhesive 3 in such a way that the outer edges of the strips 1 align to the outer edges of the base 2 as illustrated in FIG. 2.

Figure 6:
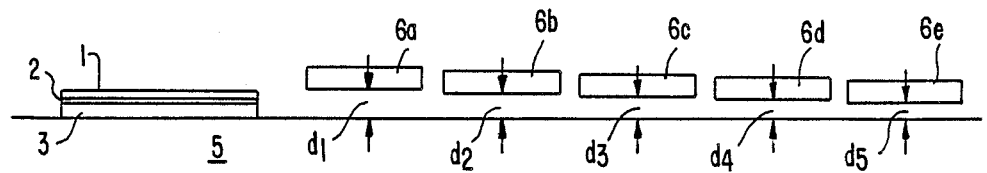
FIG. 6 is a schematic view of a polishing operation which can be used in the method for producing the tile products of the present invention.

After adhesion of the natural stone 1 to the substrate 2 with adhesive 3, the natural stone surface 1 of the laminated tile is polished and planed in a known manner. For example, as shown in FIG. 6, the laminated tile is passed under a series of polishers such as the polishers 6a to 6e while the back surface of the substrate 2 rests on the flat surface of support 5. The polishers 6a–6e may be provided such that the first polisher 6a is coarser than the second polisher 6b which is coarser than the third polisher 6c and so on, with polisher 6e being the finest. The polishers 6a–6e are separated from support 5 by predetermined distances $d_1$–$d_5$, respectively, and each polishing surface is maintained as flat as possible to the flat support surface 5. Each of the distances $d_1$–$d_5$ may be equal or the distances may diminish from $d_1$ to $d_5$. In the former case each of the distances $d_1$–$d_5$, or in the latter case the distance $d_5$, is selected to correspond to the desired thickness of the finished laminated tile. Unlike conventional natural stone slabs, the laminated tile before polishing has a substantially flat reference plane on the back of the substrate 2 as a consequence of the manufacturing process used to make the substrate 2. The flat reference plane comprises the flat back surface of the substrate 2 if protrusions are not provided, and comprises the surfaces of the protrusions if such are provided, as shown in FIG. 4. Thus, the outermost back surface of the substrate 2 has at least three points which lie in a single reference plane which is substantially parallel to the front surface of the substrate 2. Due to this flat reference plane which is not available with natural stone slabs, the finished laminated tile has substantially no thickness variations within each tile or between a series of such tiles after the polishing and planing operations. This is an important advantage over conventional natural stone tiles. Other conventional polishing and planing techniques, other than that shown in FIG. 6, may be used if such techniques take advantage of the substantially flat reference plane on the back of the substrate 2 of the laminated tile. As stated above, the lower surfaces of the polishers 6a–6e are substantially parallel to the flat surface of support 5.

The heat and pressure of polishing and planing do not affect the adhesive 3 or, preferably, cause the adhesive 3 to form an unbroken and unblemished high strength bond between the surfaces of the natural stone 1 and the substrate 2, essentially fusing the natural stone 1 and the substrate 2 together. The heat applied to the laminate can cause the adhesive to become less viscous so that it may flow between the substrate and the natural stone and fill any cracks or crevices in their mating surfaces. This perfect bonding is not achieved, of course, if an inadequate amount of adhesive 3 is used. The preferred thicknesses of the substrate 2 and natural stone 1 described herein are such that the heat caused by polishing and planing conducts to the adhesive in a manner sufficient to promote bonding.

Preferably, the outer edges of the natural stone 1 are polished and planed to conform exactly to the outer edges of the substrate 2 without altering the shape of the substrate 2 which permits adjacent tiles to be laid without substantial grouting between the tiles.

Figure 1:
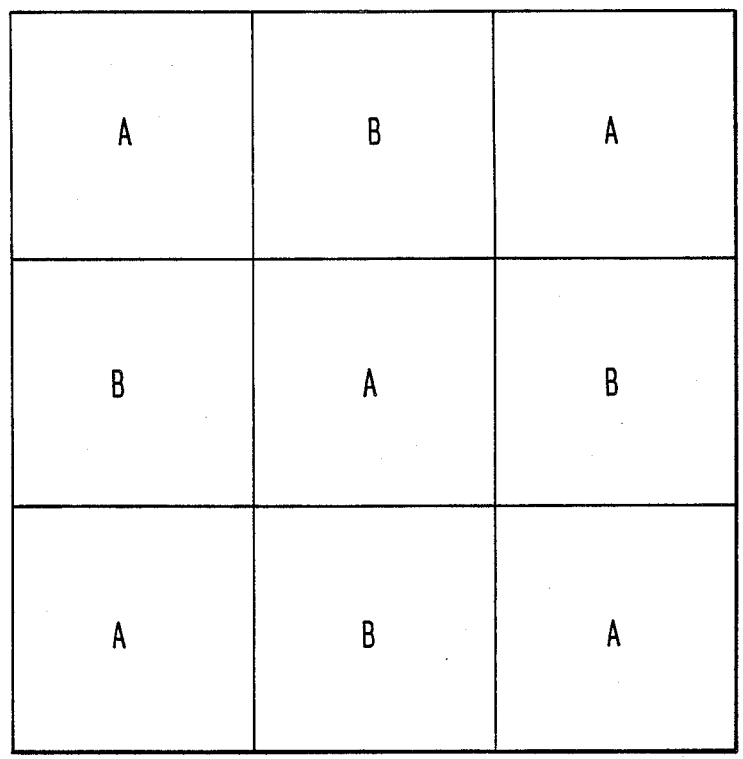
FIG. 1 is a schematic view of a typical natural stone installation design.

The laminated tile product of the present invention is much simpler to install than conventional natural stone tiles, especially for multi-color and/or multi-stone installation designs such as shown in FIG. 1.

Figure 7:
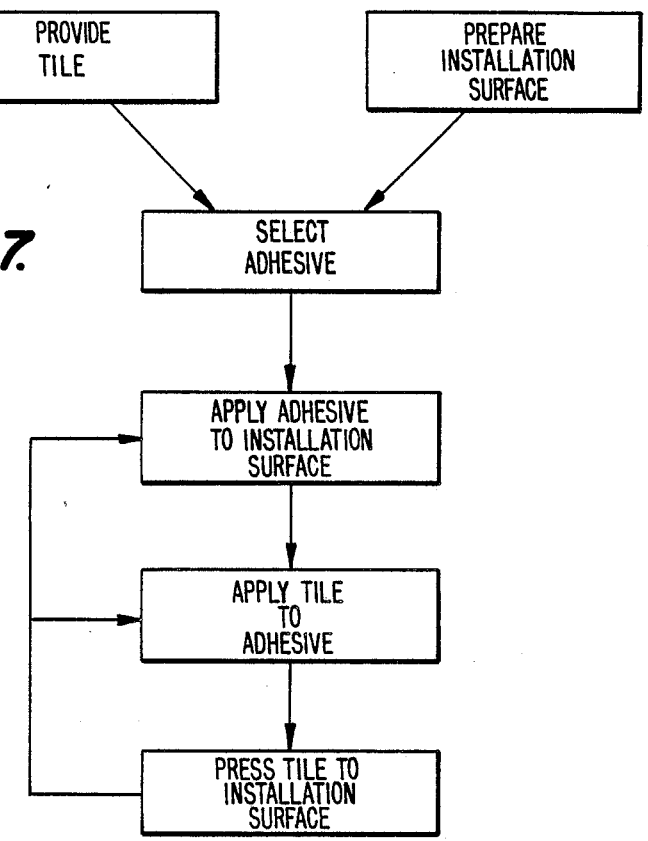
FIG. 7 is a block diagram showing the method of installing the tile product of the present invention.

As shown in FIG. 7, after providing the laminated tile product and preparing the surface on which the tile is to be installed, an appropriate adhesive is selected to produce a strong bond between the ceramic substrate 2 and the surface to which the tile is to be attached. Because the ceramic substrate 2 is uniformly strong and has a back surface which is uniformly rough, the substrate 2 will easily adhere to many adhesives. Water-based mastics used to adhere ceramics such as bisque are well known and are made by all major companies in the field, and are available "off the shelf."

The adhesive is applied to the installation surface, e.g., the floor or wall, with a conventional notched trowel. Trowels having notches of various depths are available for various applications. The tile is then applied to the adhesive and pressed to the installation surface. Adhesive applied in this manner is known in the art as a "thin-set" adhesive. The tile substrate 2 preferably has protrusions 4a–4i shown in FIG. 4, which contact the installation surface, with the critical space for the adhesive being define by the spaces between protrusions 4a–4i.

The installation method of the present invention is most advantageous in comparison with the conventional method of installing conventional natural stone tile, especially with regard to multi-color and/or multi-stone installation designs such as that shown in FIG. 1. According to the present invention since a ceramic material can be used as a substrate 2 for plurality of different colors or types of natural stones 1, a single adhesive can be selected and applied to the installation surface even if a plurality of colors or types of natural stones are desired in the installation design.

The present invention permits relatively unskilled individuals to install the laminated tile, i.e., does not require the services of skilled "marble men." Accordingly, the present invention permits "do-it-yourself" installations.

The present invention permits installation of a broader range of natural stone. For example, stones previously thought to be too brittle may now be installed since a layer 1 of such stone is supported by the substrate 2. In addition, small precious stones can be added between other stones on a single laminated tile.

While I have shown and described only one embodiment in accordance with the present invention, it is understood that the same is not limited thereto, but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A laminated tile for installation on an installation surface by a layer of adhesive, said laminated tile having a predetermined overall thickness comprising:
   a fused, fired, impact-resistant ceramic substrate having opposed, unglazed first and second major surfaces;
   a layer of natural stone; and
   an adhesive bonding said layer of natural stone to said first major surface of said ceramic substrate;
   wherein said laminated tile has higher impact resistance and load-bearing strength than a solid all natural stone tile having said predetermined overall thickness.

2. A laminated tile according to claim 1, wherein said adhesive is an adhesive whose adhesive properties improve by exposure to heat and pressure.

3. A laminated tile according to claim 2, wherein said adhesive contains cobalt.

4. A laminated tile according to claim 1, wherein said adhesive is a heat-cured adhesive.

5. A laminated tile according to claim 1, wherein said natural stone is selected from the group consisting of marble, travertine, granite, sandstone and fossilstone.

6. A laminated tile according to claim 1, wherein said substrate is made of an unglazed ceramic bisque.

7. A laminated tile according to claim 1, wherein said substrate is impervious to fluids.

8. A laminated tile according to claim 1, wherein said layer of natural stone comprises a plurality of strips made of natural stone.

9. A laminated tile according to claim 1, wherein said substrate has a plurality of raised protrusions covering a portion of said second major surface of said substrate.

10. A laminated tile according to claim 1, wherein said ceramic substrate is fired at a temperature of at least about 1,050° C.

11. A laminated tile according to claim 1, wherein said ceramic substrate has a coefficient of thermal expansion close to that of said layer of natural stone.

12. A laminated tile installation having an exposed natural stone surface comprising:

an installation surface;

a laminated tile having a predetermined thickness and comprising a fused, fired, impact-resistant ceramic substrate having opposed, unglazed first and second major surfaces; a layer of natural stone; and an adhesive bonding said layer of natural stone to said first major surface of said ceramic substrate; wherein said laminated tile has higher impact resistance and load-bearing strength than a solid all natural stone tile having said predetermined overall thickness; and a thin-set adhesive bonding said second major surface of said ceramic substrate of said laminated tile to said installation surface.

13. A laminated tile installation according to claim 12, wherein said substrate of said laminated tile has a plurality of raised protrusions covering a portion of said second major surface of said substrate and wherein said plurality of raised protrusions contact said installation surface.

14. A laminated tile installation according to claim 12, wherein said installation surface is a wall.

15. A laminated tile installation according to claim 12, wherein said installation surface is a floor.

16. A laminated tile installation according to claim 12, wherein said thin-set adhesive is a water-based mastic.

17. A laminated tile installation according to claim 12, wherein said adhesive bonding said layer of natural stone to said first major surface of said ceramic substrate is cured before said laminated tile is adhered to said installation surface.

* * * * *